United States Patent
Wang

(10) Patent No.: US 8,928,913 B2
(45) Date of Patent: Jan. 6, 2015

(54) METHOD FOR SWITCHING SERVICE PROCESS AND MEDIA SERVER

(75) Inventor: Dong Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 473 days.

(21) Appl. No.: 13/259,622

(22) PCT Filed: Aug. 24, 2009

(86) PCT No.: PCT/CN2009/073470
§ 371 (c)(1),
(2), (4) Date: Nov. 30, 2011

(87) PCT Pub. No.: WO2010/127523
PCT Pub. Date: Nov. 11, 2010

(65) Prior Publication Data
US 2012/0127539 A1    May 24, 2012

(30) Foreign Application Priority Data

May 8, 2009    (CN) .......................... 2009 1 0138244

(51) Int. Cl.
| G06F 3/12 | (2006.01) |
| H04N 1/32 | (2006.01) |
| H04N 1/40 | (2006.01) |
| H04B 1/00 | (2006.01) |
| H04N 1/333 | (2006.01) |
| H04N 1/00 | (2006.01) |

(52) U.S. Cl.
CPC .................. *H04N 1/333* (2013.01); *H04N 1/00* (2013.01); *H04N 1/00209* (2013.01); *H04N 1/00244* (2013.01); *H04N 2201/0093* (2013.01); *H04N 2201/33364* (2013.01)
USPC ...... 358/1.15; 358/442; 358/444; 379/100.01

(58) Field of Classification Search
None
See application file for complete search history.

(56) References Cited

U.S. PATENT DOCUMENTS

| 5,867,494 A | * | 2/1999 | Krishnaswamy et al. .... 370/352 |
| 6,038,302 A | * | 3/2000 | Burok et al. ............. 379/201.01 |
| 6,327,343 B1 | * | 12/2001 | Epstein et al. ............ 379/88.01 |

(Continued)

FOREIGN PATENT DOCUMENTS

| CN | 1731803 A | 2/2006 |
| CN | 1738245 A | 2/2006 |
| CN | 101098321 | 1/2008 |
| CN | 101217610 | 7/2008 |

OTHER PUBLICATIONS

International Search Report for PCT/CN2009/073470 mailed Feb. 25, 2010.

*Primary Examiner* — Madelein A Nguyen
(74) *Attorney, Agent, or Firm* — Pearl Cohen Zedek Latzer Baratz LLP

(57) ABSTRACT

The present invention discloses a method for switching service process and a media server, wherein the method for switching the service process comprises: after a first service process performed together with a facsimile terminal is completed, and when a message, which is sent by an application server and which indicates to carry out a second service process, is received by a media server, the media server switching from the first service process to the second service process; and the facsimile terminal switching from the first service process to the second service process. Therefore, the switching of the facsimile is not limited by the switching control requirements of the media gateway, which is favorable for flexible expansion and interconnection of the facsimile services.

14 Claims, 5 Drawing Sheets

(56) References Cited

U.S. PATENT DOCUMENTS

| | | | |
|---|---|---|---|
| 6,335,927 B1* | 1/2002 | Elliott et al. | 370/352 |
| 6,714,533 B1* | 3/2004 | Weich et al. | 370/352 |
| 6,731,625 B1* | 5/2004 | Eastep et al. | 370/352 |
| 6,763,226 B1* | 7/2004 | McZeal, Jr. | 455/90.2 |
| 7,035,252 B2* | 4/2006 | Cave et al. | 370/356 |
| 7,133,417 B1* | 11/2006 | Kao et al. | 370/467 |
| 7,450,567 B1* | 11/2008 | Mamnani | 370/352 |
| 7,450,702 B2* | 11/2008 | Solin | 379/100.01 |
| 8,037,138 B2* | 10/2011 | Izumi | 709/206 |
| RE42,995 E * | 12/2011 | Joffe et al. | 358/407 |
| 2001/0036176 A1* | 11/2001 | Girard | 370/352 |
| 2002/0181496 A1* | 12/2002 | Narasimhan et al. | 370/466 |
| 2003/0012183 A1* | 1/2003 | Butler et al. | 370/352 |
| 2003/0235183 A1* | 12/2003 | Skelton et al. | 370/352 |
| 2004/0146153 A1* | 7/2004 | Solin | 379/210.02 |
| 2005/0080932 A1* | 4/2005 | Liu | 709/249 |
| 2005/0105541 A1* | 5/2005 | Jain et al. | 370/401 |
| 2005/0141488 A1* | 6/2005 | Shtivelman | 370/352 |
| 2006/0007954 A1* | 1/2006 | Agrawal et al. | 370/466 |
| 2006/0050856 A1* | 3/2006 | Pence et al. | 379/93.09 |
| 2006/0067506 A1* | 3/2006 | Flockhart et al. | 379/265.09 |
| 2006/0146792 A1* | 7/2006 | Ramachandran et al. | 370/352 |
| 2007/0211302 A1 | 9/2007 | Wang | |
| 2007/0279699 A1* | 12/2007 | Boire-Lavigne et al. | 358/400 |
| 2008/0075263 A1* | 3/2008 | Levine | 379/221.08 |
| 2008/0095145 A1 | 4/2008 | Ulybin | |
| 2008/0192655 A1* | 8/2008 | Vagelos | 370/259 |
| 2008/0192904 A1* | 8/2008 | Vagelos | 379/88.16 |
| 2009/0021796 A1* | 1/2009 | Bloomfield | 358/402 |
| 2009/0086278 A1* | 4/2009 | Vendrow et al. | 358/402 |
| 2009/0109959 A1* | 4/2009 | Elliott et al. | 370/352 |
| 2009/0296912 A1* | 12/2009 | Jackson et al. | 379/211.02 |
| 2009/0316875 A1* | 12/2009 | Silver et al. | 379/207.11 |
| 2010/0034360 A1* | 2/2010 | Bettis et al. | 379/88.13 |
| 2010/0085609 A1* | 4/2010 | Hong | 358/442 |
| 2011/0075821 A1* | 3/2011 | Michaelis | 379/88.13 |
| 2011/0109936 A1* | 5/2011 | Coffee et al. | 358/1.15 |
| 2011/0191486 A1* | 8/2011 | Agrawal et al. | 709/230 |
| 2012/0017008 A1* | 1/2012 | Twitchell, Jr. | 709/238 |
| 2013/0010946 A1* | 1/2013 | Clark et al. | 379/220.01 |
| 2013/0163586 A1* | 6/2013 | Ku | 370/352 |
| 2013/0301085 A1* | 11/2013 | Jackson | 358/434 |

* cited by examiner

METHOD FOR SWITCHING SERVICE PROCESS AND MEDIA SERVER

CROSS-REFERENCE TO RELATED APPLICATIONS

This application is a National Phase Application of PCT International Patent Application No. PCT/CN09/073470, International Filing Date Aug. 24, 2009, claiming priority of Chinese Patent Application No. 200910138244.5 filed May 8, 2009, both of which are incorporated herein by reference.

FIELD OF THE INVENTION

The present invention relates to the field of communication technology, in particular to a method for switching service process, and a media server.

BACKGROUND OF THE INVENTION

The next generation network is a network driven by services. FIG. 1 is a system framework chart of the next generation network, wherein a media server is an independent equipment used for providing dedicated media resource functions and also is an important equipment in a packet network. Under the control of an application server, the media server provides the media resource functions required by various services in soft switching, including functions such as playback, sound recording, Dual Tone Multi Frequency (DTMF for short) number receiving, facsimile, conference, Text To Sound (TTS for short) and Audible Speech Recognition (ASR for short) and so on.

Currently, with the development of networks, interconnection and intercommunication are realized among a plurality of network types. In digital times, due to functions such as text interaction, facsimile and leaving message among different departments, facsimile functions of the media server is more and more widely applied. Due to various network types, the interconnection and intercommunication for the facsimile may be carried out among different network domains (for example, Public Switched Telephone Network (PSTN) and IP network domains), which facilitates the facsimile to be widely applied cross network domains.

However, currently, the informing switch of the facsimile is realized by a facsimile terminal through a media gateway. This switching manner is limited by the media gateway. As the requirements on switching standards of the media gateways of different manufacturers are different, flexible development of the facsimile services is blocked to some extent by the informing switch of the facsimile realized by the media gateways, which is not beneficial for the intercommunication of the facsimile among the networks.

SUMMARY OF THE INVENTION

In view of the above, embodiments of the present invention provides an improved solution for switching service process, which is used for solving the problem in the prior art that adopting a media gateway to realize the informing switch of the facsimile is not beneficial for the intercommunication of the facsimile among networks.

According to one embodiment of the present invention, a method for switching service process is provided.

The method for switching the service process according to one embodiment of the present invention comprises: a media server switching from a first service process to a second service process, after the first service process performed together with a facsimile terminal is completed, and when a message, which is sent by an application server and which indicates to perform a second service process, is received by a media server; and the facsimile terminal switching from the first service process to the second service process.

The step of the facsimile terminal switching from the first service process to the second service process comprises: the media server informing, according to the received message, the facsimile terminal to switch from the first service process to the second service process; and the facsimile terminal switching to a channel corresponding to the second service process.

Further, the facsimile terminal switching to the channel corresponding to the second service process comprises: the media server informing a media gateway to perform a service process switch from the first service process to the second service process; and the media gateway controlling the facsimile terminal to switch to the channel corresponding to the second service process.

Further, the step of the media server switching from the first service process to the second service process comprises: the media server receiving a signaling which carries media description and which is returned by the media gateway after the media gateway controls the facsimile terminal to switch to the channel corresponding to the second service process; and the media server switching, according to the media description, to a channel corresponding to the second service process.

The step of the media server switching from the first service process to the second service process comprises: the media server triggering, according to the received message, the media server to switch from the first service process to the second service process, and switching media resource to a channel corresponding to the second service process.

The step of the facsimile terminal switching from the first service process to the second service process comprises: triggering the facsimile terminal to switch from the first service process to the second service process, and the facsimile terminal switching media resource to the channel corresponding to the second service process.

Further, before the media server receives the message, the method further comprises: the facsimile terminal receiving and sending an instruction which indicates to start the second service process; and the application server receiving the instruction, and sending the message to the media server.

Further, the step of the facsimile terminal switching to a channel corresponding to the second service process comprises: the facsimile terminal switching, according to the received instruction which indicates to start the second service process, to the channel corresponding to the second service process.

Preferably, the first service process is an audible speech service process, and the second service process is a facsimile service process.

Preferably, the first service process is the facsimile service process, and the second service process is the audible speech service process.

According to another embodiment of the present invention, a media server is provided.

According to one embodiment of the present invention, the media server comprises a receiving module and a switching module, wherein the receiving module is configured to receive, after a first service process performed together with a facsimile terminal is completed, a message which is sent from an application server and which indicates to perform a second service process; and the switching module is configured to switch to a channel corresponding to the second service process according to the message received by the receiving module.

Further, according to one embodiment of the present invention, the media server further comprises: an informing module, configured to inform the facsimile terminal to switch to the channel corresponding to the second service process.

In virtue of at least one of the above solutions of the present embodiments, when audible speech is required to be switched to facsimile or the facsimile is required to be switched to the audible speech, the switching is triggered by a media server, which hence solves the problem that the intercommunication among the networks can not be realized because the media gateway is adopted to realize the informing switch of the facsimile. Under the conditions that different network modes are in interconnection, the switching of the facsimile is not limited to the switching control requirements of the media gateway, and can flexibly meet different requirements of the gateways. Therefore, the facsimile services become more flexible, which is favorable for the flexible expansion and intercommunication of the facsimile services.

Other characteristics and advantages of the present invention will be described in the following specification. Furthermore, it will become partially apparent in the specification or be understood through implementation of the present invention. The objects and other advantages of the present invention can be realized and obtained through the structure which is specifically indicated in the specification, the claims and the drawings.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

Overview on Functions

As requirements on switching standards of media gateways of different manufacturers are different, flexible development of facsimile services is blocked to some extent by informing switch of the facsimile realized by the media gateways, which is not beneficial for the intercommunication of the facsimile among networks. Aiming at this problem, one embodiment of the present invention provides an improved method for switching service process. As current services operation content and the specific resource used by the services operation can be learned by a media server, and furthermore an allocating process of the resource thereof can be controlled by the media server, flexible facsimile switching process is performed based on the media server in the embodiments of the present invention, which can realize flexible resource switching aiming at control requests of various resources.

Under the conditions without conflicts, the embodiments and the characteristics thereof in the present application can be combined with each other.

The preferable embodiments of the present invention will be described in combination with the drawings hereinafter. It should be understood that the preferable embodiments described herein are only used for describing and explaining the present invention rather than for limiting the present invention.

According to an embodiment of the present invention, a method for switching service process is provided firstly.

Figure 1:
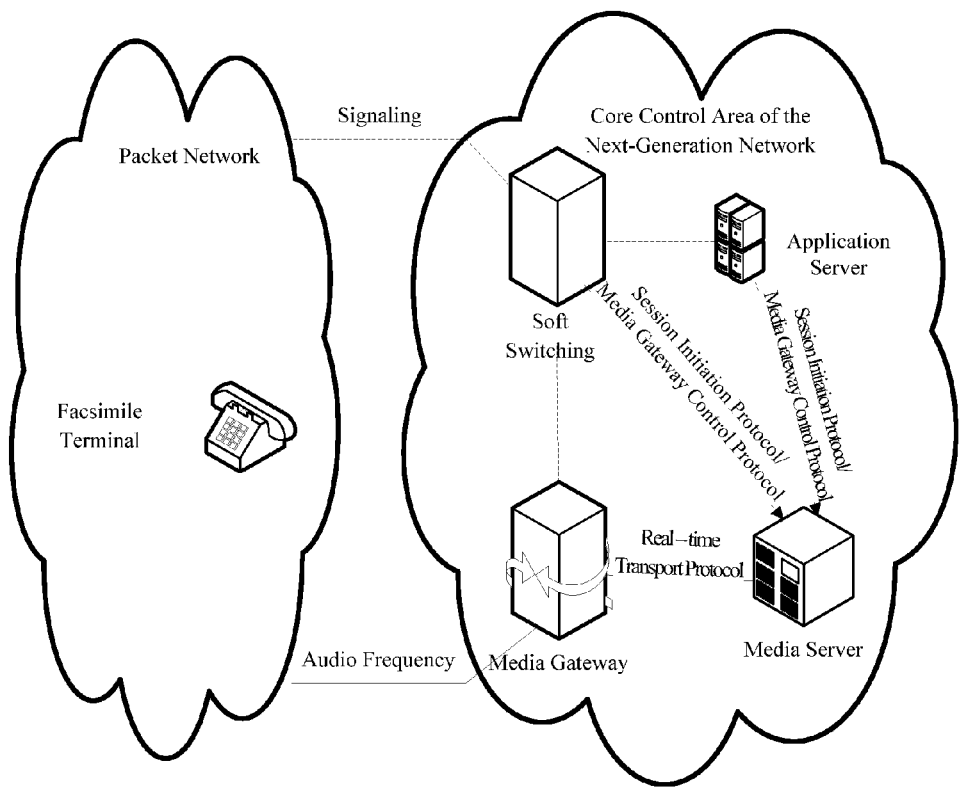
FIG. 1 is a system framework chart of the next generation network in the related art.
Figure 2:
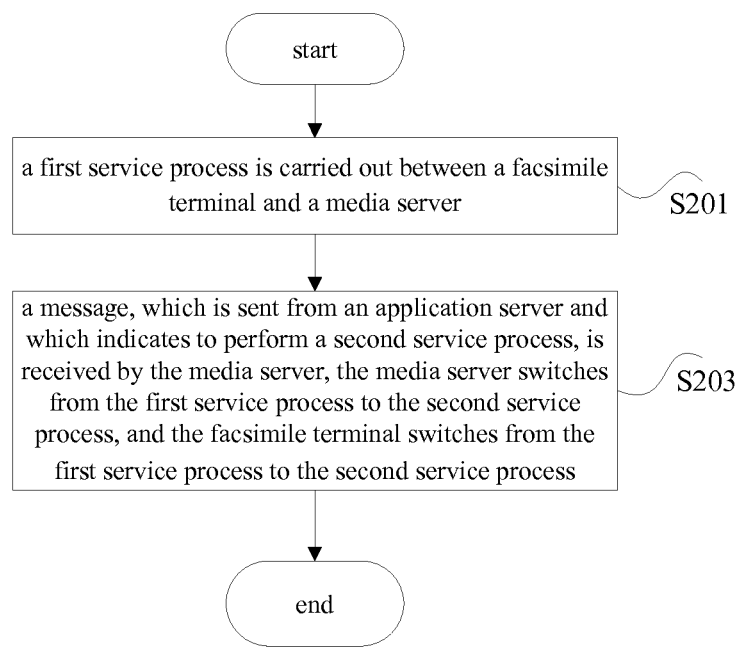
FIG. 2 is a flow chart of a method for switching service process according to an embodiment of the present invention.

FIG. 2 is a flow chart of a method for switching service process according to an embodiment of the present invention. As shown in FIG. 2, the method for switching the service process according to the embodiment of the present invention mainly comprises the following steps (step S201-step S203).

Step S201, a first service process is carried out between a facsimile terminal and a media server.

In a specific implementation process, the first service process above can be an audible speech service process. Specifically, the first service process can be carried out by dialing an access code at a user side (that is, the facsimile terminal); speech number receiving is carried out for the facsimile terminal by the media server according to difference of the first service processes; and after the facsimile terminal receives a playback prompt, selection operation can be carried out by the facsimile terminal according to different requirements. Alternatively, the first service process above also can be a facsimile service process, that is, after the facsimile service process is completed, the first service process also can be switched to the audible speech service process.

Step S203, after the first service process is completed, a message, which is sent from an application server and which indicates to perform a second service process, is received by the media server, the media server switches from the first service process to the second service process, and the facsimile terminal switches from the first service process to the second service process.

In a specific implementation process, when the second service process is required to be carried out (for example, a facsimile is required to be carried out), the facsimile terminal is operated by a user at the facsimile terminal side, i.e. a facsimile start key of the facsimile terminal is pushed down and the facsimile services is triggered. The service which is triggered is informed through the application server to the media server to carry out a facsimile operation (that is, the above message is sent by the application server); the media server determines that the second service process needs to be performed, the media server switches from the first service process to the second service process. Similarly, the facsimile terminal also switches from the first service process to the second service process.

In a specific implementation process, there are two manners of the switching of the media server and the facsimile terminal. One manner is that: the media server actively informs the facsimile terminal to perform the switching (the manner adopted in the Embodiment 1); and after receiving a media description returned after the facsimile terminal completes the switching, the switching is performed according to the media description. The other manner is that: after receiving the above media description, the media server automatically initiates a channel switching within the media server according to a pre-configuration (the manner adopted in the Embodiment 2); and after receiving an instruction which indicates to start the second service process, the facsimile terminal also initiates a switching automatically.

In additions, the first service process above is the audible speech service process, while the second service process above is the facsimile service process, or the first service process above is the facsimile service process, while the second service process above is the audible speech service process.

The two above mentioned manners for switching the service process will be described respectively hereinafter.

The First Manner

In this manner, when the media server determines it needs to switch to the second service process (that is, when the message, which is sent from the application server and which indicates to perform the second service process, is received by the media server), the facsimile terminal is informed by the media server to switch the service process. Specifically, a media gateway is informed by the media server to switch the service process; after receiving this channel, the media gateway controls the facsimile terminal to switch to a channel corresponding to the second service process. After the switching is completed, a signaling which carries media description is returned to the media server by the media gateway. According to the media description carried in the signaling, the media server completes a channel switching for the media resource of the media server, and switches to the channel corresponding to the second service process.

The Second Manner

In this manner, a negotiation is carried out by a system (that is, the whole facsimile system) in advance, and uniform configuration is arranged. For example, T30 or T38 is used specifically. The facsimile terminal is controlled to perform switching by the media gateway. According to an operation signaling request (if the second service process is requested to be carried out), the media server automatically initiates the channel switching within the media server.

Specifically, the user indicates, through an operation key, the facsimile terminal to start the second service process; the facsimile terminal sends a received instruction, which reaches the media server through the application server; the media server can determine, according to the instruction, that it needs to switch to the second service process, and the switching of the service process of the media server is triggered, the media resource is switched to the channel corresponding to the second service process, and the negotiation of the second service process is started.

Furthermore, after receiving the operation instruction from the user, the facsimile terminal side triggers the switching of the service process of the facsimile terminal, and begins to perform the facsimile negotiation.

In the above method for switching service process provided according to the embodiment of the present invention, the switching can be triggered by the media server, thereby avoiding the limitation of the media gateway with respect to the facsimile switching.

In order to further understand the specific implementation process of the above method for switching service process provided by the embodiments of the present invention, the method will be described through specific embodiments hereinafter.

Embodiment 1

In this embodiment, when determining that a switching is required, a media server actively informs a facsimile terminal to carry out the switching, that is, the first manner above is adopted to carry out the switching.

Figure 3:
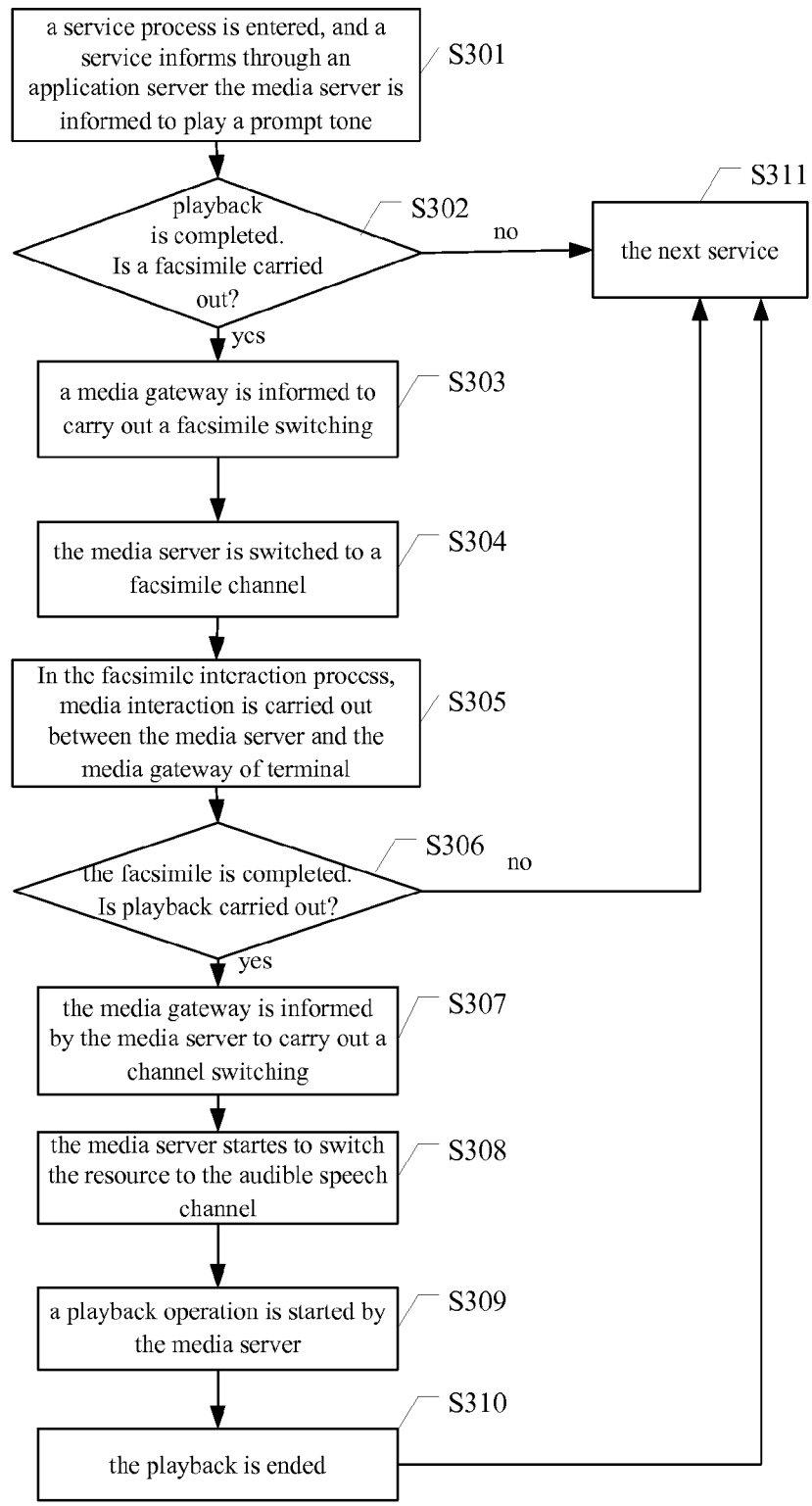
FIG. 3 is a flow chart of Embodiment 1.

FIG. 3 is a flow chart of the embodiment. As shown in FIG. 3, the embodiment mainly comprises the following steps (step S301-step S311).

Step S301, an access code is dialed at a user side, a service process is entered, and a service informs through an application server the media server to play a navigation sound prompt.

Step S302, according to service process control, the media server performs playback and number receiving; after the playback is completed, it is judged whether a facsimile is carried out or not, wherein if yes, the step S303 is carried out; otherwise, the current service is ended, the next service is entered and the step S311 is carried out.

In the specific implementation process, the manner used by the media server for judging whether the facsimile is carried out or not comprises, but is not limited, the followings.

1. The application server sends to the media server a signaling which indicates to carry out the facsimile.

2. The media server detects a signaling sent by the opposite terminal through the application server, and judges whether the facsimile is carried out or not according to the signaling.

In a specific implementation process, the user can start the facsimile by selecting a facsimile operation and pushing down a facsimile key.

Step S303, according to control requirements of the services facsimile, the media server actively informs the facsimile terminal side under a media gateway to carry out a facsimile switching; after the facsimile terminal is controlled by the media gateway to complete the switching, a signaling which carries media description is returned to the media server.

Step S304, after receiving the above signaling, the media server performs, according to the media description carried in the signaling, the switching control on the resource of the media server to switch to a facsimile channel.

Step S305, in the interaction process of the facsimile, media interaction is carried out between the media server and the media gateway of the terminal.

Specifically, in each phase of the facsimile interaction, the negotiation regulations of facsimile media are complied. Furthermore, in the present step, the media transmission of the facsimile data is carried out between the media server and the facsimile terminal until the media transmission of the facsimile data is completed.

Step S306, after the facsimile is completed, the media server judges whether playback is carried out or not, wherein if yes, the step S307 is carried out; otherwise, the step S311 is performed to carry out the next service.

In a specific implementation process, after the facsimile is completed, a facsimile completion event is reported by the media server, and after receiving the event, the application server informs the service and the service enters the next process. Specifically, after the facsimile is completed, the facsimile completion event is detected and reported to the application server by the media server. After the event is received by the application server, the service is informed and the facsimile is completed. After the service receives the completion of the facsimile, the next service process is entered. If the service needs to continue the playback after the facsimile, the application server controls the media server to carry out audible speech for the terminal user.

Step S307, the media gateway is informed by the media server to switch channel, and to switch the channel to an audible speech channel; and after the facsimile terminal is controlled by the media gateway to complete the switching, a signaling which carries media description is returned to the media server.

Step S308, according to the media description carried in the signaling above, the media server starts to switch the resource to the audible speech channel.

Step S309, a playback operation is started by the media server.

Step S310, the playback is completed.

Step S311, the next service process is carried out.

Embodiment 2

In this embodiment, a switching is realized by the second manner above. When determining that the switching to a second service process is required, a media server switches automatically to a channel corresponding to the second service process. When receiving an instruction of starting the second service process, a facsimile terminal switches automatically to a channel corresponding to the second service process. In additions, in this embodiment, uniform facsimile type is required to be adopted in a system.

Figure 4:
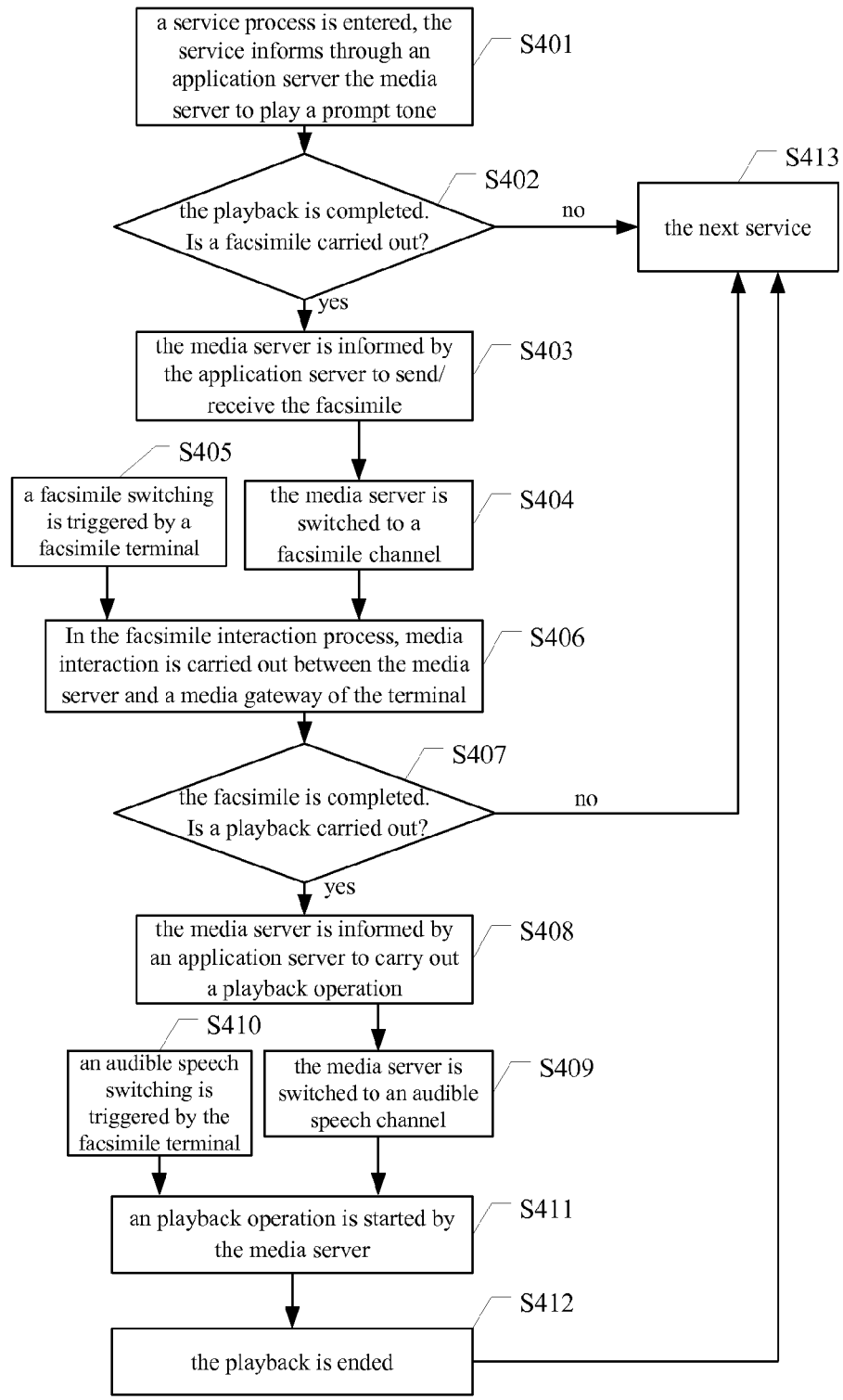
FIG. 4 is a flow chart of Embodiment 2.

FIG. 4 is a flow chart of this embodiment. As shown in FIG. 4, in the embodiment, realizing a switching mainly comprises the following steps (step S401-step S413).

Step S401, an access code is dialed at a user side, a service process is entered. The service informs through an application server the media server to play a navigation sound prompt.

Step S402, the playback and number receiving are carried out by the media server according to service process control. After audible speech is completed, it is judged whether a facsimile is carried out or not, wherein if yes, the step S403 is carried out; otherwise, the current services is completed, the next service is entered and the step S413 is carried out.

Step S403, the media server is informed by the application server to send/receive the facsimile.

Step S404, according to media description in the audible speech service process, the media server switches automatically the inner resource to a facsimile channel. Furthermore, the media server performs a negotiation with the facsimile terminal through a facsimile media signaling.

Step S405, a facsimile switching is triggered by a start key of the facsimile terminal, and the facsimile terminal automatically switches to a facsimile channel.

Step S406, in the facsimile interaction process, media interaction is carried out between the media server and a media gateway of the terminal.

Stop S407, after the facsimile is completed, the media server judges whether playback is carried out or not, wherein if yes, the step S408 is carried out; otherwise, the step S413 is carried out and the next service is carried out.

If the service is required to offer a playback prompt to a terminal user in this service process (that is, the process after the facsimile is completed), it is required that the media server is informed of the playback prompt through the application server.

In a specific implementation process, after the facsimile is completed, a facsimile completion event is reported by the media server, and after receiving the event, the application server informs the service and the service enters the next process. Specifically, after the facsimile is completed, the facsimile completion event is detected and reported to the application server by the media server. After the event is received by the application server, the service is informed and the facsimile is completed. After the service receives that the completion of the facsimile, the next service process is entered. If the service needs to continue the playback after the facsimile, the media server is controlled by the application server to carry out audible speech for the terminal user.

Step S408, the media server is informed by the application server to carry out a playback operation.

Step S409, according to the media description of the received signaling, the media server switches to an audible speed channel.

Step S410, after the facsimile is completed, the facsimile terminal switches automatically to the audible speech channel.

Step S411, the playback operation is started by the media server.

Step S412, the playback is completed.

Step S413, the next service process is carried out.

According to one embodiment of the present invention, a media server is also provided. This media server can be used for realizing the above methods for switching service process provided in the embodiments of the present invention.

Figure 5:
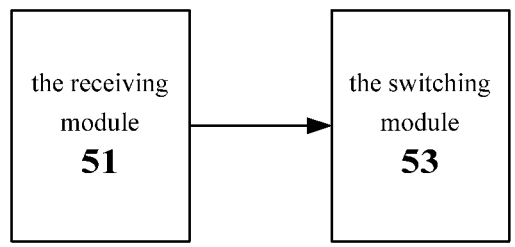
FIG. 5 is a structural schematic diagram of a media server according to an embodiment of the present invention.
Figure 6:
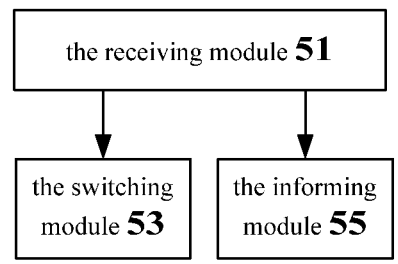
FIG. 6 is a structural schematic diagram of a media server according to a preferable embodiment of the present invention.

FIG. 5 is a structural schematic diagram of a media server according to an embodiment of the present invention. FIG. 6 is a structural schematic diagram of a media server according to an embodiment of the present invention. As shown in FIG. 5, the media server according to the embodiment of the present invention mainly comprises a receiving module 51 and a switching module 53, wherein the receiving module 51 is configured to receive, after a first service process performed together with a facsimile terminal is completed, a message which is sent from an application server and which indicates to perform a second service process; the switching module 53 is connected with the receiving module 51 and is configured to switch to a channel corresponding to the second service process according to the message received by the receiving module 51.

Further, as shown in FIG. 6, the media server according to the embodiment of the present invention further comprises an informing module 55 which is connected with the receiving module 51, and configured to inform, in the case that the receiving module 51 receives the above message, a facsimile terminal to perform the service process switch, switching to a channel corresponding to second service process.

As above mentioned, with the technical solutions provided by the embodiments of the present invention, when an audible speech is required to be switched to a facsimile or the facsimile is required to be switched to the audible speech, the switching is triggered by a media server, so as to solve the problem that the conventional facsimile service is limited by the different media gateways having the non-uniform conditions for informing the switching. Under the conditions that different network modes are in intercommunication, the switching of the facsimile can be made not to be limited to the switching control requirements of the media gateway, and can flexibly meet different requirements of the gateways. Therefore, the facsimile services become more flexible, which is favorable for the flexible expansion and intercommunication of the facsimile services. Meanwhile, the utilization ratio of media resource can be improved, and the flexibility, practicability and reliability of facsimile intercommunication can be enhanced.

The above description is only the preferable embodiments of the present invention, and is not limited to the present invention. For those skilled in the art, the present invention can have various modifications and variations. Within the spirit and principle of the present invention, any modifications, equal alternations and improvements should be included in the protection scope of the present invention.

What is claimed is:

1. A method for switching service process, comprising:
a media server switching from a first service process to a second service process, after the first service process performed together with a facsimile terminal is completed, and when a message, which is sent by an application server and which indicates to perform a second service process, is received by a media server; and the facsimile terminal switching from the first service process to the second service process;

wherein the step of the facsimile terminal switching from the first service process to the second service process comprises:

the media server informing, according to the received message, the facsimile terminal to switch from the first service process to the second service process; and the facsimile terminal switching to a channel corresponding to the second service process;

wherein the first service process is an audible speech service process, and the second service process is a facsimile service process; or the first service process is the facsimile service process, and the second service process is the audible speech service process.

2. The method according to claim 1, wherein the step of the facsimile terminal switching to the channel corresponding to the second service process comprises:

the media server informing a media gateway to perform a service process switch from the first service process to the second service process; and the media gateway controlling the facsimile terminal to switch to the channel corresponding to the second service process.

3. The method according to claim 2, wherein the step of the media server switching from the first service process to the second service process comprises:

the media server receiving a signaling which carries media description and which is returned by the media gateway after the media gateway controls the facsimile terminal to switch to the channel corresponding to the second service process; and the media server switching, according to the media description, to a channel corresponding to the second service process.

4. The method according to claim 2, wherein before the media server receives the message, the method further comprises:

the facsimile terminal receiving and sending an instruction which indicates to start the second service process; and the application server receiving the instruction, and sending the message to the media server.

5. The method according to claim 4, wherein the step of the facsimile terminal switching to a channel corresponding to the second service process comprises:

the facsimile terminal switching, according to the received instruction which indicates to start the second service process, to the channel corresponding to the second service process, wherein the first service process is an audible speech service process, and the second service process is a facsimile service process; or the first service process is the facsimile service process, and the second service process is the audible speech service process.

6. The method according to claim 3, wherein before the media server receives the message, the method further comprises:

the facsimile terminal receiving and sending an instruction which indicates to start the second service process; and the application server receiving the instruction, and sending the message to the media server.

7. The method according to claim 6, wherein the step of the facsimile terminal switching to a channel corresponding to the second service process comprises:

the facsimile terminal switching, according to the received instruction which indicates to start the second service process, to the channel corresponding to the second service process, wherein the first service process is an audible speech service process, and the second service process is a facsimile service process; or the first service process is the facsimile service process, and the second service process is the audible speech service process.

8. The method according to claim 1, wherein the step of the media server switching from the first service process to the second service process comprises:

the media server triggering, according to the received message, the media server to switch from the first service process to the second service process, and switching media resource to a channel corresponding to the second service process; and the step of the facsimile terminal switching from the first service process to the second service process comprises:

triggering the facsimile terminal to switch from the first service process to the second service process, and the facsimile terminal switching media resource to the channel corresponding to the second service process.

9. The method according to claim 8, wherein before the media server receives the message, the method further comprises:

the facsimile terminal receiving and sending an instruction which indicates to start the second service process; and the application server receiving the instruction, and sending the message to the media server.

10. The method according to claim 9, wherein the step of the facsimile terminal switching to a channel corresponding to the second service process comprises:

the facsimile terminal switching, according to the received instruction which indicates to start the second service process, to the channel corresponding to the second service process.

11. The method according to claim 10, wherein the first service process is an audible speech service process, and the second service process is a facsimile service process; or the first service process is the facsimile service process, and the second service process is the audible speech service process.

12. The method according to claim 1, wherein before the media server receives the message, the method further comprises:

the facsimile terminal receiving and sending an instruction which indicates to start the second service process; and the application server receiving the instruction, and sending the message to the media server.

13. The method according to claim 12, wherein the step of the facsimile terminal switching to a channel corresponding to the second service process comprises:

the facsimile terminal switching, according to the received instruction which indicates to start the second service process, to the channel corresponding to the second service process.

14. A media server, comprising:

a receiving module, configured to receive, after a first service process performed together with a facsimile terminal is completed, a message which is sent from an application server and which indicates to perform a second service process; and a switching module, configured to switch to a channel corresponding to the second service process according to the message received by the receiving module;

an informing module, configured to inform the facsimile terminal to switch to the channel corresponding to the second service process;

wherein the first service process is an audible speech service process, and the second service process is a facsimile service process; or the first service process is the facsimile service process, and the second service process is the audible speech service process.

* * * * *